Sept. 7, 1954
B. WALKER
2,688,372
VEHICLE HAVING OFFSET DRIVE SHAFT AND
TIRE LOCATED ADJACENT THERETO
Original Filed Oct. 23, 1946
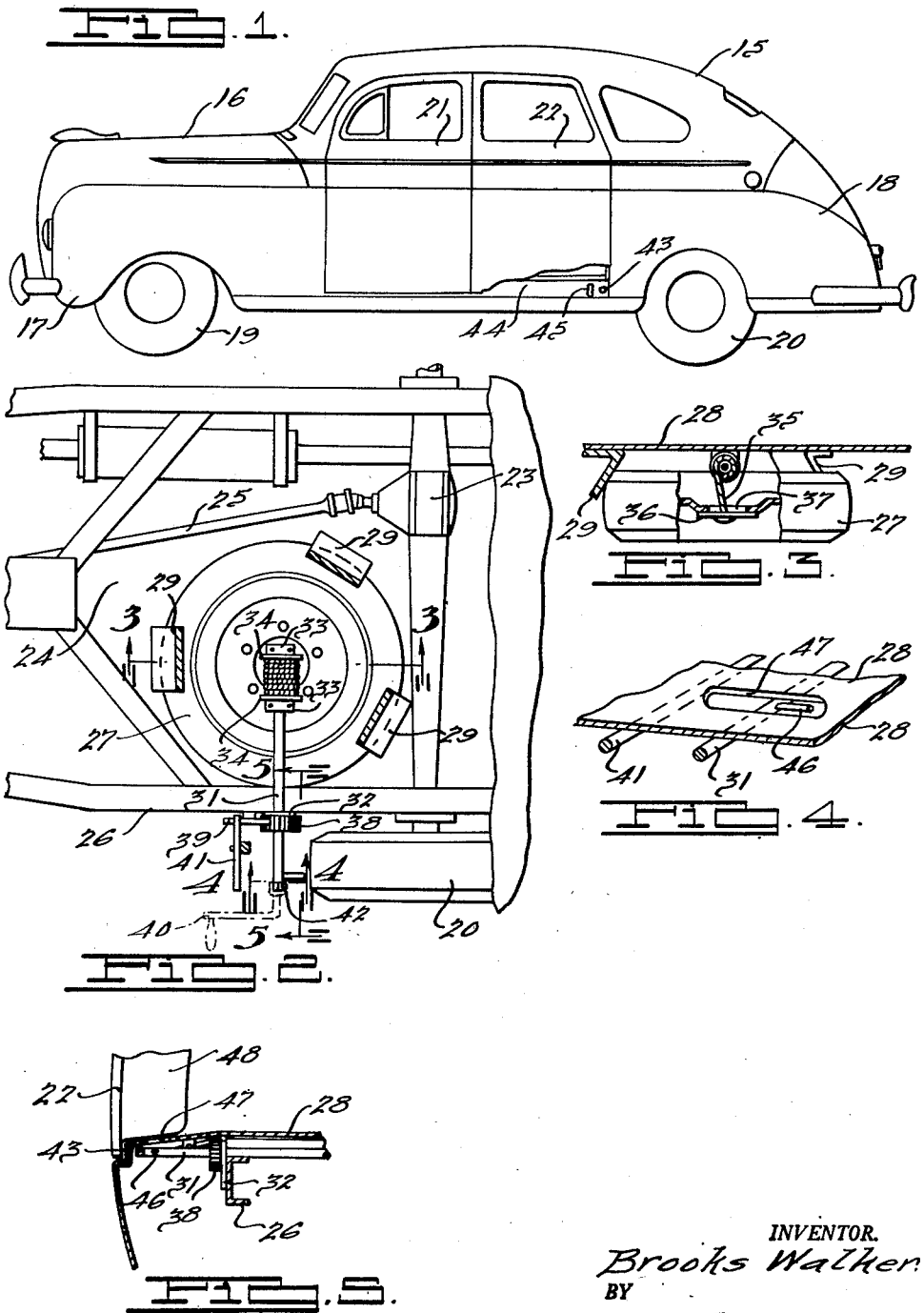
INVENTOR.
Brooks Walker
BY
Harness, Dickey & Pierce
ATTORNEYS.

Patented Sept. 7, 1954

2,688,372

UNITED STATES PATENT OFFICE 2,688,372

VEHICLE HAVING OFFSET DRIVE SHAFT AND TIRE LOCATED ADJACENT THERETO

Brooks Walker, Piedmont, Calif.

Original application October 23, 1946, Serial No. 705,089. Divided and this application July 6, 1949, Serial No. 103,291

6 Claims. (Cl. 180—1)

1

This invention relates to automobiles, and particularly to structure thereof for the reception and storage of a spare wheel or tire, and is a division of my application, Serial No. 705,089, filed October 23, 1946, which has become Pat. No. 2,563,981 dated August 14, 1951, for improvements in Automotive Vehicle Gas Tank and Tire Mounting.

It has been the practice in the past to support the gasoline tank under the floor of the rear compartment of an automobile from which gasoline is delivered to the carburetor of the engine. The tire or spare wheel was mounted within the rear compartment, thereby reducing substantially the area available for the storage of luggage and like articles.

The present invention has for its main object the disposition of the spare wheel and tire under the body forwardly of the gas tank so as to substantially increase the available area in the rear of the storage compartment for the reception of luggage and other articles.

A further object of the invention is to shift the differential housing of the automobile to one side of the center line thereof so as to provide space between the propeller housing and the chassis frame for the reception of a tire against the bottom of the body.

A still further object of the invention is to provide a raising means for the wheel or tire which is supported beneath the floor thereof and which is operated by a removable crank at the sill of the door which is enclosed by the door and rendered unavailable when the door is closed.

A still further object of the invention is to provide a ratchet wheel on the shaft of the raising device of the tire and a latch which is operable when the door is open and also a pin on the shaft which prevents the shaft from rotating when the latch of the ratchet wheel is unlatched when the door is closed.

Other objects and features of novelty of the invention will be specifically pointed out or will become apparent when referring, for a better understanding of the invention, to the following description taken in conjunction with the accompanying drawing, wherein:

Figure 1 is a broken view in side elevation of an automobile embodying features of this invention;

Fig. 2 is a broken sectional view of the automobile taken below the floor thereof, to disclose the operating mechanism of the present invention;

Fig. 3 is a sectional view of the structure illustrated in Fig. 2, taken on the line 3—3 thereof;

2

Fig. 4 is a broken perspective view of a portion of the door and the operating mechanism which is located directly beneath the door rail at the bottom thereof, as viewed from line 4—4 of Fig. 2, and Fig. 5 is a sectional view of the structure illustrated in Fig. 2, taken on the line 5—5 thereof.

Referring to the figures, an automobile 15 is illustrated of conventional form having a hood 16, front fenders 17 and rear fenders 18 which extend over the front and rear wheels 19 and 20 respectively. Between the fenders 17 and 18 front and rear doors 21 and 22 are hingedly mounted on both sides of the vehicle body.

The differential 23 is shifted to the right-hand side of the automobile, as viewed in Fig. 2, to provide an area 24 between the propeller housing 25 and the rail 26 of the left side of the chassis frame large enough to receive the spare wheel 27. Beneath the floor 28 of the body, a plurality of brackets 29 extend downwardly for receiving the tire when raised thereagainst. The raising mechanism embodies a shaft 31 which is supported on the chassis frame 26 by a bracket 32 and supported by bearings 33 to the floor 28 of the body. Washers 34 adjacent to the bearings are fixed on the shaft to form a sheave about which a cable 35 may be wound. The end of the cable is provided with a rectangular plate 36 which may be inserted through an opening 37 in the spare wheel and may extend across the opening in position to lift the wheel when the cable is wound about the sheave on the shaft 31. Outwardly of the rail 26, a ratchet wheel 38 is secured, having a latch finger 39 in engagement with the teeth thereof. A pivoted lever 41 extends parallel to the shaft 31 and is located in position to release the lever 39 from the teeth of the sprocket wheel 38. The end of the shaft 31 is provided with a hexagonal head 42 which is located in alignment with an aperture 43 in the sill portion 44 of the automobile body so that it may be engaged by the wheel removing wrench 40 provided for removing the bolts or nuts from the wheels. A similar aperture 45 is aligned with the end of the lever 41 so that the lever 41 and shaft 31 may be operated when the door 22 on the left hand side of the body is open.

To provide further assurance that the latch 39 will not inadvertently be released and permit the spare wheel 27 to be lowered when the automobile is being driven, a pin 46 extends outwardly of the shaft 31 in alignment with an aperture 47 in the floor 28 of the vehicle. The aperture 47, as illustrated in Fig. 5, is aligned with the rail 48 of the door so that when the door 22 is in closed position the pin will strike the bottom portion of the rail and prevent the shaft 31 from rotating. In this manner, even though the latching element 39 is released from the teeth of the ratchet wheel 38, the pin 46 will prevent the tire from dropping so long as the door 22 is retained in closed position. It is to be understood that the pin 46 may be a separate element to be inserted in an aperture in the shaft 31 after the wheel has been raised, to provide a safety lock.

What is claimed is:

1. In an automobile having a body, a floor to said body, front and rear wheels, a spare wheel, a space below the floor of said vehicle between the front and rear wheels adapted to receive said spare wheel in a substantially horizontal position, means attached to said automobile adjacent to a passenger entrance door for raising said spare wheel into said spare wheel receiving space, passenger entrance doors on said vehicle, and means for preventing said raising means from operating when the passenger entrance door adjacent to said raising means is closed.

2. In an automobile having a chassis frame with a forward cross member and a body secured by springs to a rear axle housing and having a differential housing offset from the center thereof to provide an area rearwardly of the cross member of the chassis frame and forwardly of the axle housing on one side of the chassis frame which is greater than that on the other for the reception of a spare wheel, means for raising the spare wheel upwardly into the greater area within the chassis frame and for retaining the spare wheel in raised position, and brackets secured to the body against which the wheel is drawn.

3. In an automotive vehicle having a body containing a door supported on a plurality of wheels, means on said body for supporting a spare wheel beneath the body comprising means for raising and lowering the spare wheel from the under side of the body, said raising and lowering means being located on the body adjacent to a door, said door when closed prevents access to the raising and lowering means.

4. In an automobile having a body mounted on a plurality of wheels, the body having a floor and an access opening closed by a door, raising means for a spare wheel located beneath the body for raising and supporting a rear wheel against the under surface of the floor of the body, and a shaft for operating such raising means, said shaft being located adjacent to the access opening to be rendered inaccessible when the door is in closed position.

5. In an automobile body having front and rear supporting wheels, a floor for the body, an access opening for the body, a closure for said opening, brackets on the under side of the floor for receiving a spare wheel, means supported by the floor for raising and securing said spare wheel against the brackets, and a shaft for operating said raising means having one end adjacent to said access opening to be rendered inaccessible when said closure is in closed position.

6. In an automobile body having front and rear supporting wheels, a floor for said body, a door covering an access opening in said body, a drive shaft for driving the wheels at one end of said vehicle, said drive shaft being substantially offset from the longitudinal center line of said vehicle, brackets for receiving a spare wheel disposed at one side of said offset drive shaft between said front and rear wheels below said floor, mechanism for raising a spare wheel and securing it in said brackets, and a shaft for operating said mechanism, said shaft being so located relative to said access opening as to be rendered inaccessible when the door of the body is closed.

References Cited in the file of this patent

UNITED STATES PATENTS

| Number | Name | Date |
|---|---|---|
| 1,318,694 | Roesch | Oct. 14, 1919 |
| 2,131,746 | Morrison | Oct. 4, 1938 |

FOREIGN PATENTS

| Number | Country | Date |
|---|---|---|
| 380,670 | Great Britain | Sept. 22, 1932 |